US007505035B2

(12) United States Patent
Nitawaki

(10) Patent No.: US 7,505,035 B2
(45) Date of Patent: Mar. 17, 2009

(54) POWER-DOWN CIRCUIT FOR A DISPLAY DEVICE

(75) Inventor: Shouji Nitawaki, Miyazaki (JP)

(73) Assignee: Oki Semiconductor Co., Ltd. (JP)

( * ) Notice: Subject to any disclaimer, the term of this patent is extended or adjusted under 35 U.S.C. 154(b) by 652 days.

(21) Appl. No.: 11/104,642

(22) Filed: Apr. 13, 2005

(65) Prior Publication Data

US 2005/0231501 A1 Oct. 20, 2005

(30) Foreign Application Priority Data

Apr. 19, 2004 (JP) ............................ 2004-123084

(51) Int. Cl.
*G06F 3/038* (2006.01)

(52) U.S. Cl. ...................................................... 345/211

(58) Field of Classification Search .................. 345/211
See application file for complete search history.

(56) References Cited

U.S. PATENT DOCUMENTS 6,166,726 A * 12/2000 Uchida et al. ............... 345/211

FOREIGN PATENT DOCUMENTS

| | | |
|---|---|---|
| JP | 11-167366 | 6/1999 |
| JP | 2003-295841 | 10/2003 |

* cited by examiner

*Primary Examiner*—Amr Awad
*Assistant Examiner*—Randal Willis
(74) *Attorney, Agent, or Firm*—Studebaker & Brackett PC; Donald R. Studebaker

(57) ABSTRACT

A power-down circuit for an image display panel has a switch connected between a ground power line and a display power line, which carries a display voltage higher than the main power supply voltage of the device. When the main power supply voltage falls below a certain level, the control terminal of the switch is connected to the display power line through a voltage dropping element, thereby turning the switch on to discharge the display voltage to ground. The voltage dropping element, which may be a parasitic diode, ensures that the switch remains on until the display voltage has reached or nearly reached the ground level.

22 Claims, 6 Drawing Sheets

POWER-DOWN CIRCUIT FOR A DISPLAY DEVICE

BACKGROUND OF THE INVENTION

1. Field of the Invention

The present invention relates to a power-down circuit useful in, for example, a liquid crystal display (LCD) to prevent an abnormal image from appearing when the power supply of the display is shut off.

2. Description of the Related Art

Recent LCDs generally have built-in power supply circuits that use charge pumps, for example, to generate a comparatively high voltage such as twelve volts (12 V) from a comparatively low logic power supply voltage such as 3 V. The high voltage is divided to obtain the voltages that are applied to individual picture elements in the liquid crystal panel to express gradations of lightness and darkness specified by image data. When the power of the LCD is switched on or off, the image data become erratic, so a preprogrammed sequence of operations is carried out in the built-in power supply circuit to assure that unintended high voltages are not applied to the liquid crystal panel.

The preprogrammed power-on or power-off sequence may fail to be executed properly if power is lost unexpectedly because of, say, an electrical outage, actuation of a circuit breaker, or a drop in battery voltage. In these cases, the capacitors used in the charge pump circuit may retain high voltages that continue to be applied to the display panel, causing an abnormal image to appear, until the charge is dissipated by natural discharge. Continued application of high voltages after loss of power may also degrade the liquid crystal.

The built-in power supply therefore includes circuitry for discharging the charge pump when the main power supply is shut off. FIG. 1 shows a typical example of such circuitry, disclosed in Japanese Patent Application Publication No. 2003-295841. This circuit discharges a pair of capacitors 531, 535 that hold LCD driving voltages V1 and V5, which are output from a segment driver 512-1 and a common driver 512-2, respectively. The discharging circuit comprises a charge shunting section 560, a voltage detecting section 570, and a voltage shunting section 580.

The voltage detecting section 570 has a capacitor 574 connected between ground (GND) and a node N1 that receives the main power supply voltage VCC through a resistor 571. The function of the capacitor 574 is to keep node N1 near the VCC level for a while after the power supply is shut off. The voltage detecting section 570 also has an inverter 600 connected between ground and node N1, the inverter 600 comprising a p-channel metal-oxide-semiconductor (PMOS) transistor 572 and an n-channel metal-oxide-semiconductor (NMOS) transistor 573 that receive the power supply voltage VCC as their gate inputs.

The voltage shunting section 580 comprises a resistor 581 and an NMOS transistor 582 connected in series between the power supply VCC and ground. The charge shunting section 560 comprises NMOS transistors 561 and 565 with sources connected to ground and drains connected to capacitors 531 and 535. The gates of NMOS transistors 582, 561, and 565 receive the output of the inverter 600.

In this circuit, when the main power supply is on and VCC is above the threshold voltage of NMOS transistor 573, the output of the inverter 600 is at the low (ground) level, so NMOS transistors 561 and 565 are turned off.

When the main power supply is shut off, VCC falls toward ground, but node N1 lingers near the normal VCC level (e.g., 3 V) because of the charge stored in capacitor 574, so PMOS transistor 572 turns on and the output of the inverter 600 goes high. NMOS transistors 561 and 565 now turn on and start discharging capacitors 531 and 535. Since NMOS transistor 582 is also turned on, the main power supply is discharged and VCC falls rapidly to the ground level. The higher voltages V1 and V5 fall rapidly enough to prevent an obviously abnormal display from appearing on the LCD panel and prevent degradation of the liquid crystal.

A problem with the conventional circuit shown in FIG. 1 is that while capacitors 531 and 535 are being discharged, the gate potential of the discharging transistors 561, 565 is also being drawn down toward the rapidly-falling VCC level. The discharging transistors may therefore turn off before the driving voltages V1 and V5 reach the ground level. The final levels of the driving voltages depend on the parameters of the resistors, capacitors, and transistors in FIG. 1, but if the discharging transistors have a high threshold voltage, which is desirable for preventing sub-threshold leakage, the driving voltages may be left at about the one-volt level when the discharging transistors turn off, causing unwanted dim artifacts to persist on the display.

SUMMARY OF THE INVENTION

An object of the present invention is to provide a power-down circuit that can reliably discharge a display voltage generated by boosting a main power supply voltage even when the main power supply is shut off abruptly.

The invented power-down circuit is used in a display device having a main power line receiving a main power supply voltage, a ground power line receiving a ground voltage lower than the main power supply voltage, and a display voltage generator that boosts the main power supply voltage to generate a display voltage higher than the main power supply voltage and outputs the display voltage on a display power line. The power-down circuit includes a voltage detector, a switch, and a control circuit.

The voltage detector receives the main power supply voltage and generates a shutdown signal having a first state when the main power supply voltage is above a predetermined level and a second state when the main power supply voltage falls below the predetermined level. The switch has a control terminal, and connects the display power line to the ground power line responsive to the voltage at the control terminal.

The control circuit connects the control terminal of the switch to the ground power line when the shutdown signal is in the first state, and connects the control terminal of the switch to the display power line through a voltage dropping element when the shutdown signal is in the second state. The voltage dropping element may be a parasitic diode in the control circuit or the display voltage generator.

When power is shut off and the main power supply voltage falls, the switch turns on, discharging the display power line to ground. As the voltage on the display power line falls, the voltage at the control terminal of the switch also falls, but because of the voltage drop in the voltage dropping element, the control terminal voltage stays above the display voltage, assuring that the switch remains on until the display voltage has fallen well below the on-off threshold level of the switch, regardless of the speed with which the main power supply voltage falls.

DETAILED DESCRIPTION OF THE INVENTION

Figure 1:
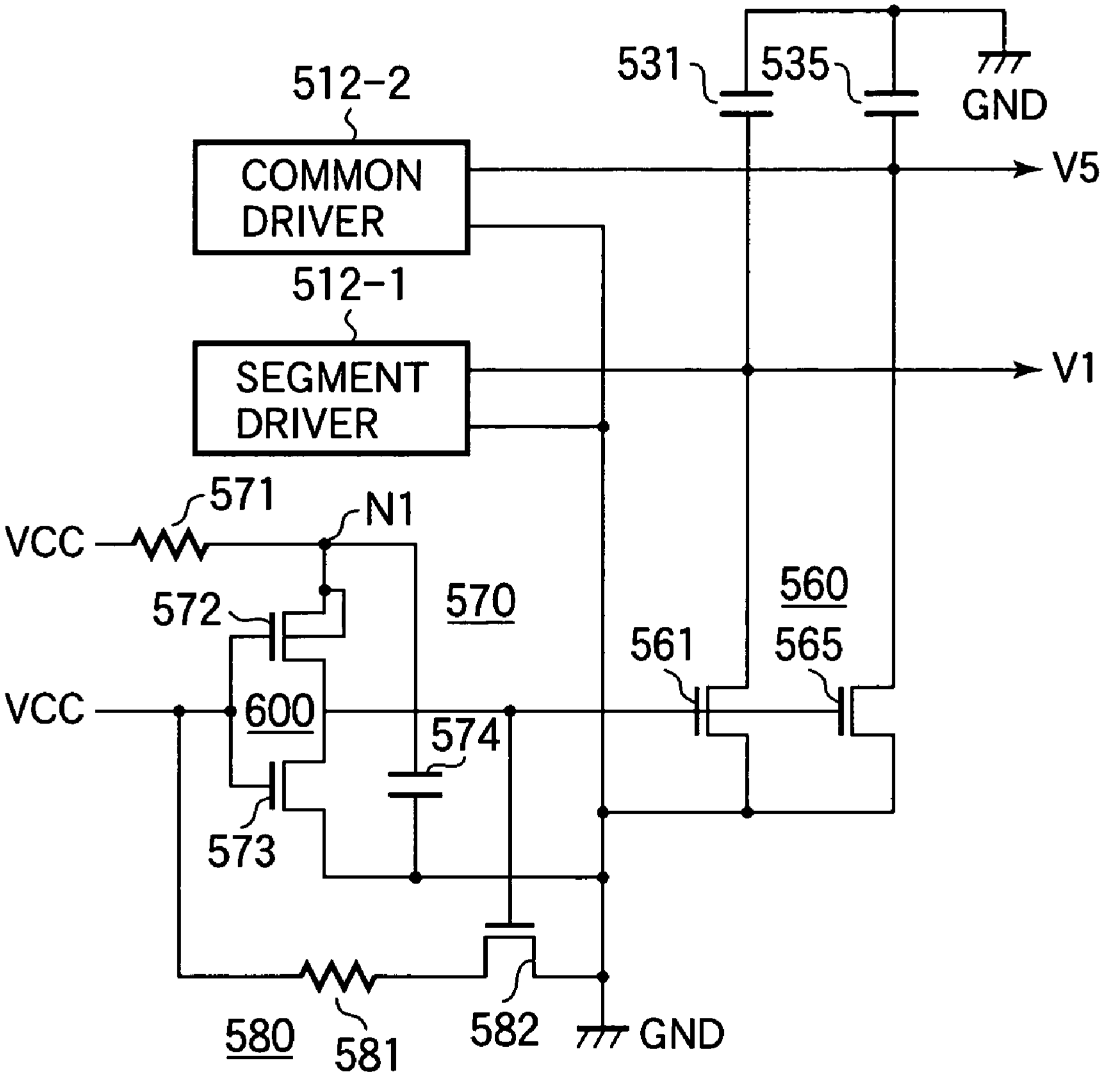
FIG.1 PRIOR ART
FIG. 1 is a circuit diagram of a conventional discharge circuit for discharging LCD driving voltages.

Embodiments of the invention will now be described with reference to the attached drawings, in which like elements are indicated by like reference characters.

First Embodiment

Figure 2:
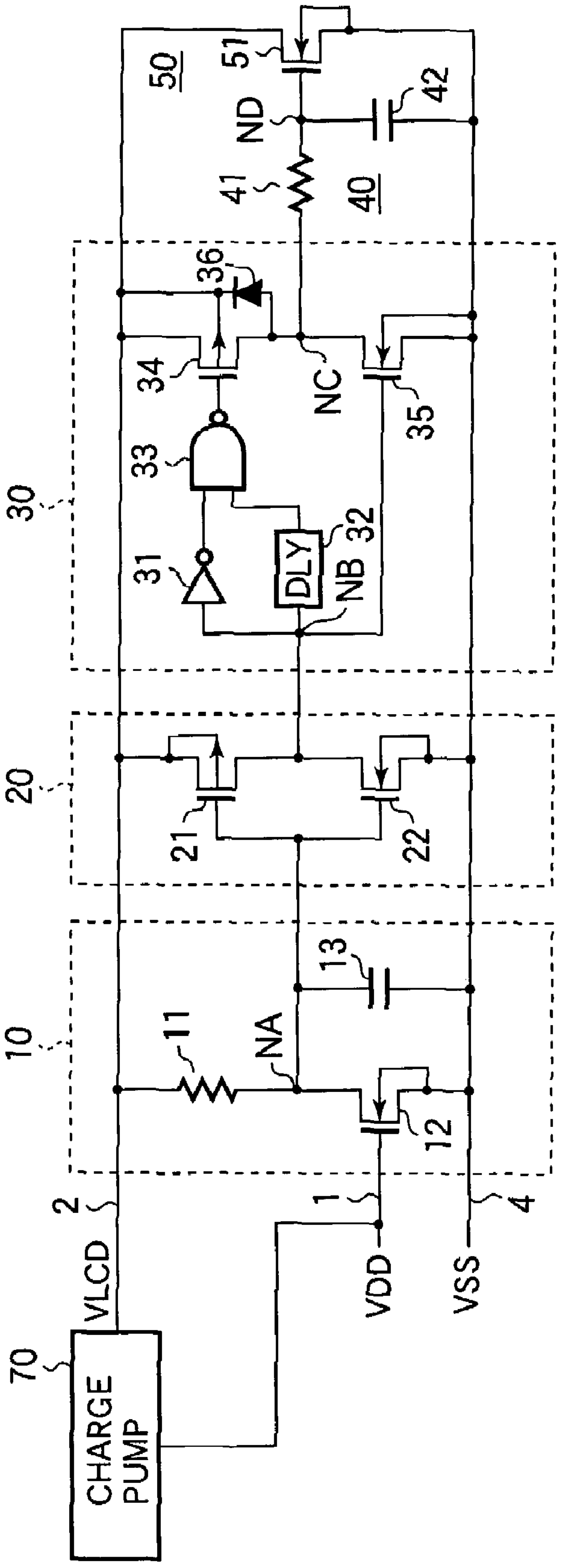
FIG. 2 is a circuit diagram illustrating a power-down circuit according to a first embodiment of the invention.

Referring to FIG. 2, the power-down-circuit in the first embodiment comprises a voltage detector 10, an inverter 20, a control circuit 30, a delay circuit 40, and a switching circuit 50. The voltage detector 10 is connected to a main power line 1 carrying a main power supply voltage VDD (for example, 3 V), which is also supplied to logic circuits (not shown) that drive an LCD. The voltage detector 10 and other parts of the power-down circuit are also connected to a display power line 2 carrying a liquid crystal driving voltage VLCD (for example, 12 V) generated by a charge pump 70 forming a display voltage generator, and a ground power line 4 carrying a reference or ground potential VSS (0 V).

The voltage detector 10 comprises a resistor 11, an NMOS transistor 12, and a capacitor 13 interconnected to detect a rapid decrease of the VDD level. One end of resistor 11 is connected to the display power line 2 and the other end is connected to a node NA. NMOS transistor 12 has a drain connected to node NA, a source connected to the ground power line 4, and a gate (control terminal) connected to the main power line 1. Capacitor 13 is connected between node NA and the ground power line 4, and functions as a noise filter.

The inverter 20 comprises a PMOS transistor 21 and an NMOS transistor 22, and receives the output voltage (serving as a shutdown signal) from node NA in the voltage detector 10 as an input signal. PMOS transistor 21 is designed to have a larger transconductance (mutual conductance) than that of NMOS transistor 22 so that the switching point of the inverter 20 is greater than one half of the power supply voltage (VLCD/2). To provide noise immunity, the resistance value of resistor 11 is large enough that the output level of the voltage detector 10 is considerably lower than the switching point of the inverter 20 when NMOS transistor 12 is conductive in normal operation.

The control circuit 30 receives the output of the inverter 20 at a node NB, and outputs a control signal from a node NC. When the input level at node NB is high, the output level at node NC is low. When the input level at node NB changes from high to low, node NC is driven high for a predetermined time and is then left in a high-impedance state.

The control circuit 30 comprises an inverter 31, a delay (DLY) unit 32, a two-input NAND gate 33, a PMOS transistor 34, an NMOS transistor 35, and a parasitic diode 36. The inverter 31 inverts the signal at node NB. The delay unit 32 delays the signal at node NB for a predetermined time. The NAND gate 33 receives the inverted signal from the inverter 31 and the delayed signal from the delay unit 32. PMOS transistor 34 has a gate (control terminal) connected to the output terminal of the NAND gate 33, a source (first current terminal) connected to the display power line 2, and a drain (second current terminal) connected to node NC. NMOS transistor 35 has a drain (first current terminal) connected to node NC, a source (second current terminal) connected to the ground power line 4, and a gate (control terminal) connected to node NB, and is thus controlled by the output of the inverter 20.

Figure 3:
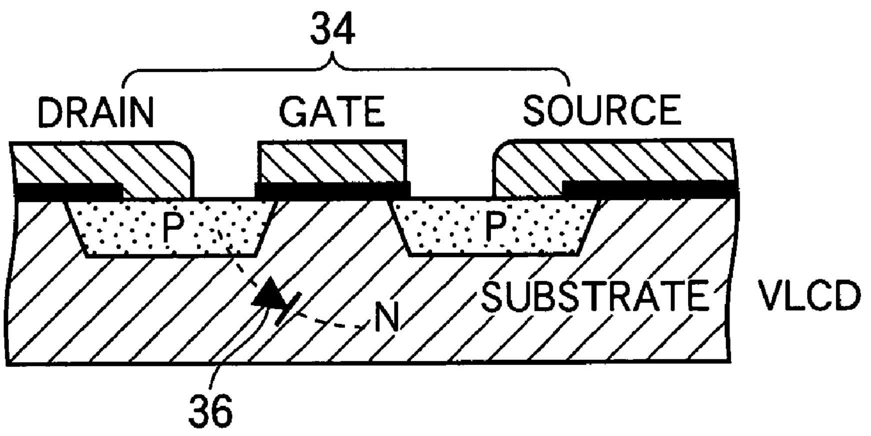
FIG. 3 is a sectional drawing of a PMOS transistor.

The delay unit 32 may be a resistor-capacitor delay circuit or a circuit comprising an even number of gates connected in cascade. The inverter 31, delay unit 32, and NAND gate 33 are powered by the liquid crystal driving voltage VLCD, which is supplied from the display power line 2 by branch power lines not shown in the drawing. The parasitic diode 36 functions as a voltage dropping element, and is a parasitic element formed by the p-type drain region and n-type substrate of PMOS transistor 34, as shown in FIG. 3. The n-type substrate is connected to the display power line 2 and held at the VLCD potential, so the parasitic diode 36 is equivalent to a diode connected between the drain of PMOS transistor 34 and the display power line 2 as shown in FIG. 2.

The delay circuit 40 is an integrating circuit comprising a resistor 41 connected between node NC and a node ND, and a capacitor 42 connected between node ND and the ground power line 4. The signal at node NC is transmitted to node ND with a delay determined by the resistance and capacitance values of resistor 41 and capacitor 42.

The switching circuit 50 comprises an NMOS transistor 51, the current terminals (drain and source) of which are connected to the display power line 2 and ground power line 4, respectively, the gate (the control terminal) being connected to node ND. NMOS transistor 51 shunts charge between the display power line 2 and ground power line 4 according to the signal at node ND. In place of NMOS transistor 51, an analog switch comprising NMOS and PMOS transistors connected in parallel may be used as the switching circuit 50.

Figure 4:
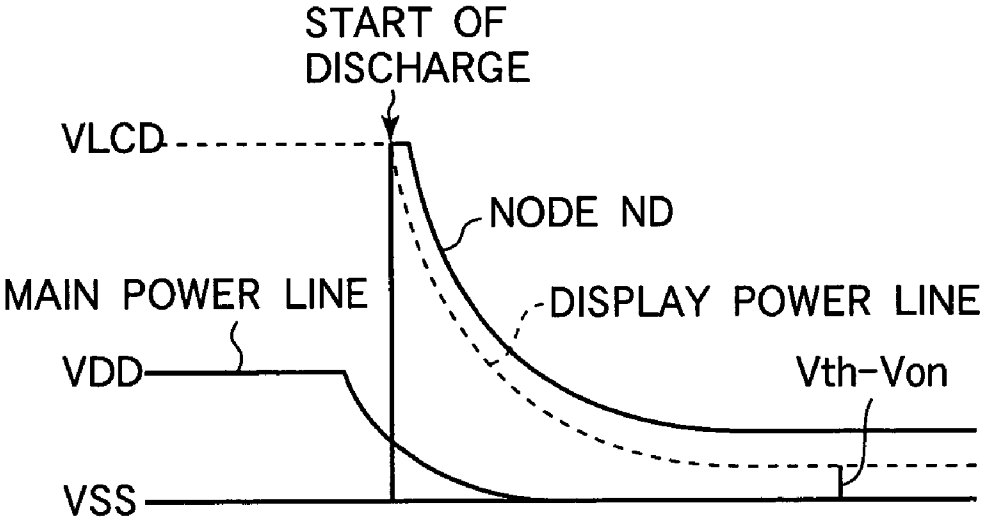
FIG. 4 is a signal waveform diagram illustrating the operation of the circuit in FIG. 2.

Next, the operation of the circuit shown in FIG. 2 will be described with reference to the signal waveform diagram shown in FIG. 4.

When the power supply voltage VDD on the main power line 1 is above a predetermined level, NMOS transistor 12 is on, so the voltage level at node NA is low. The inverter 20 drives node NB high, turning PMOS transistor 34 off and NMOS transistor 35 on, which makes the voltage levels at nodes NC and ND both low. As a result, NMOS transistor 51 is off and does not shunt charge from the display power line 2 to the ground power line 4; the display power line 2 supplies the liquid crystal driving voltage VLCD generated by the charge pump 70 of the liquid crystal panel (not shown).

When the power supply is shut off and the power supply voltage VDD falls below the predetermined level, NMOS transistor 12 is turned off and its drain voltage (the shutdown signal voltage level at node NA) goes high. The inverter 20 detects this change and drives node NB low.

In the control circuit 30, when node NB goes low, NMOS transistor 35 is turned off and the output of inverter 31 goes high. The output of the delay unit 32 remains high for a predetermined time, and then goes low. As a result, the output of the NAND gate 33 (received at the gate of PMOS transistor 34) goes low for the predetermined time and then returns to the high level. The inverter 31, delay unit 32, and NAND gate 33 thus function as a pulse generator that generates a low pulse when the shutdown signal goes changes from the low state to the high state.

Accordingly, when the shutdown signal goes high, PMOS transistor 34 is turned on for a predetermined length of time, during which node NC is electrically connected to the display power line 2. During this time, capacitor 42 (node ND) is charged to nearly the liquid crystal driving voltage VLCD. PMOS transistor 34 is then turned off, leaving node NC in a high-impedance state, connected to the display power line 2 only through the reverse-biased parasitic diode 36.

When the voltage level at node ND goes high, NMOS transistor 51 is turned on and starts to discharge the liquid crystal driving voltage VLCD on the display power line 2 to the ground power line 4. Since node ND is charged to nearly the original VLCD level, as the potential on the display power line 2 falls, the parasitic diode 36 becomes forward-biased and node ND also begins to discharge through resistor 41 and parasitic diode 36. The discharging of node ND begins when the potential at node ND is higher than the potential on the display power line 2 by an amount equal to the forward voltage or turn-on voltage Von of the parasitic diode 36. The potentials of node ND and the display power line 2 then continue to decrease while maintaining substantially this relationship. Therefore, when the voltage at node ND falls to about the threshold voltage Vth of NMOS transistor 51 and the discharging operation stops, the voltage on the display power line 2 is reduced to a level less than Vth−Von (about 0.1 to 0.5 V).

The power-down circuit of the first embodiment accordingly discharges the display power line 2 to a lower level than is reached in the conventional circuit shown in FIG. 1, and assures that the final discharged VLCD level is considerably lower (at least Von lower) than the threshold voltage Vth the discharging transistor.

In a variation of the first embodiment, the inverter 20 has the usual inverter switching point (VLCD/2); the transconductances of the transistors 21 and 22 in the inverter 20 are not adjusted to obtain a higher switching point. The first embodiment may also be modified by altering the circuit topology of the control circuit 30 in various ways.

Second Embodiment

Figure 5:
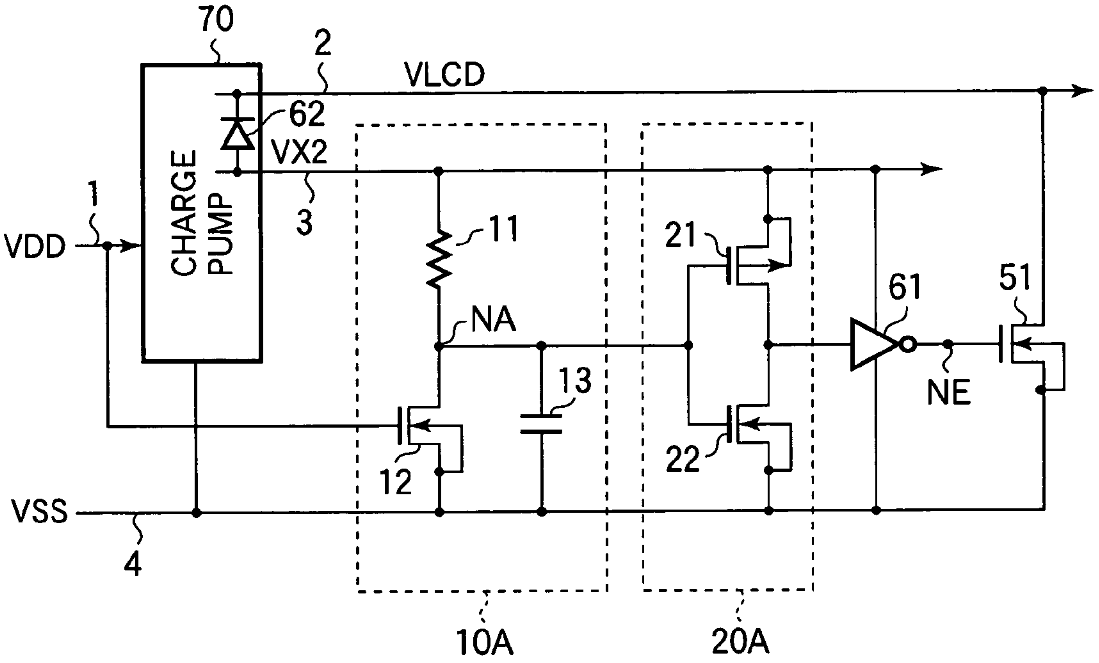
FIG. 5 is a circuit diagram illustrating a power-down circuit according to a second embodiment of the invention.

Referring to FIG. 5, the power-down circuit of the second embodiment comprises a voltage detector 10A, a cascaded pair of inverters 20A and 61, a diode 62, an NMOS transistor 51, and a display voltage generator or charge pump 70. The charge pump 70 boosts the VDD power supply voltage (for example, 3 V) on the main power line 1 to generate a liquid crystal driving voltage VLCD (for example, 12 V) which is output on a display power line 2. The charge pump 70 also generates a boosted voltage VX2 having a value (for example, 6 V) intermediate between VDD and VLCD for output on an intermediate power line 3. In the second embodiment, the diode 61 functions as a control circuit for connecting the control terminal of the switch to the ground power line when the shutdown signal is in the low state, and connecting the control terminal of the switch to the display power line through a voltage dropping element when the shutdown signal is in the high state.

If, for example, the charge pump 70 has a three-stage structure that boosts the VDD input to successive levels of 2×VDD, 3×VDD, and 4×VDD (where 4×VDD=VLCD), then the output of the first stage (2×VDD) can be taken as VX2.

The voltage detector 10A and inverter 20A have the same configurations as the voltage detector 10 and inverter 20 in FIG. 2, respectively, except that the voltage detector 10A and inverter 20A are powered from the intermediate power line 3 and operate on the intermediate boosted voltage VX2 instead of the liquid crystal driving voltage VLCD. Inverter 61, which inverts the output of inverter 20A, also operates on the intermediate boosted voltage VX2, and drives the gate of NMOS transistor 51. NMOS transistor 51 has a drain and a source connected to the display power line 2 and ground power line 4, respectively, and shunts charge from the display power line 2 to the ground power line 4 when turned on.

The diode 62 has its anode connected to the intermediate power line 3 and its cathode connected to the display power line 2. Although the diode 62 may be provided as a separate element, a diode which is normally present as a parasitic element in the charge pump 70 is used as the diode 62. For example, the diode 62 may be a parasitic diode formed (as in FIG. 3) by the drain area and substrate of a PMOS transistor in an analog switch provided between a node for outputting the intermediate voltage VX2 and a node for outputting the liquid crystal driving voltage VLCD, the substrate of this PMOS transistor being connected to the display power line 2.

Figure 6:
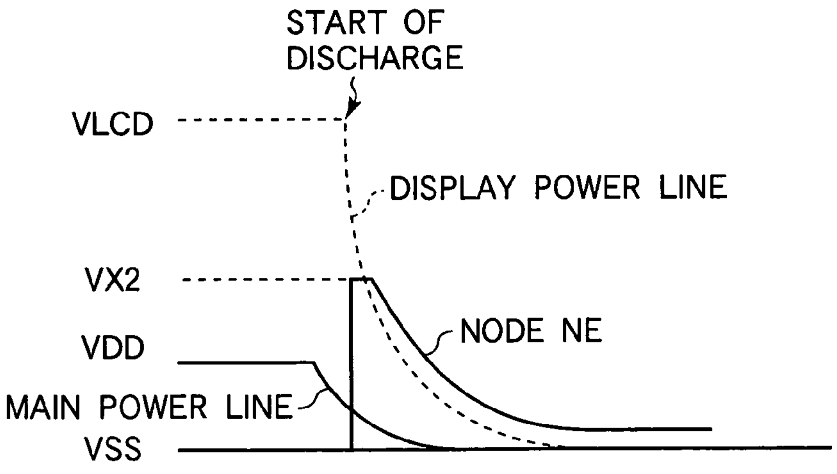
FIG. 6 is a signal waveform diagram illustrating the operation of the circuit in FIG. 5.

Next, the operation of the circuit in FIG. 5 will be described with reference to the signal waveform diagram in FIG. 6.

When the supply voltage VDD on the main power line 1 is above a predetermined level, NMOS transistor 12 is on, so the voltage level at node NA is low, which makes the output of inverter 20A high and the output of inverter 61 low. As a result, NMOS transistor 51 is turned off and does not shunt charge between the display power line 2 and ground power line 4; the liquid crystal driving voltage VLCD generated by the charge pump 70 is maintained on the display power line 2 and supplied therefrom to the liquid crystal panel (not shown).

When the power supply is shut off and the power supply voltage VDD falls below the predetermined level, NMOS transistor 12 is turned off and its drain voltage (the shutdown signal at node NA) goes high. Inverter 20A detects this change in the shutdown signal and outputs a low logic level (VSS), which drives inverter 61 to output a high level (VX2) at node NE.

When the voltage level at node NE goes high, NMOS transistor 51 is turned on and starts to discharge the liquid crystal driving voltage VLCD on the display power line 2 to the ground power line 4. At first, since VLCD is higher than VX2, diode 62 is reverse-biased and the intermediate power line 3 holds the boosted voltage VX2 unchanged.

When the voltage level on the display power line 2 drops below the boosted voltage VX2, diode 62 becomes forward-biased. The intermediate power line 3 now begins to discharge through diode 62 and NMOS transistor 51 to the ground power line 4, so that VX2 and VLCD decrease together as shown in FIG. 6. VX2 remains higher than VLCD by an amount at least equal to the turn-on voltage Von of diode 62. The voltage level at node NE (the gate voltage of NMOS transistor 51) therefore remains higher than the drain voltage of NMOS transistor 51, enabling the liquid crystal driving voltage VLCD to be reduced to a value close to the ground level VSS, as in the first embodiment. If the intermediate power line 3 discharges sufficiently slowly, NMOS transistor 51 can remain turned on until the display power line 2 has discharged substantially completely, allowing VLCD actually to reach the VSS level, as shown in FIG. 6.

Since the voltage detector 10A and inverters 20A, 61 in the second embodiment are powered from the intermediate power line 3 instead of the display power line 2, and the intermediate power line 3 stays at a higher potential level than the display power line 2 during the final stages of the discharging process, the second embodiment can achieve an effect similar to the effect of the first embodiment with a simple inverter 61 instead of the more complex control circuit and delay circuit used in the first embodiment.

Third Embodiment

Figure 7:
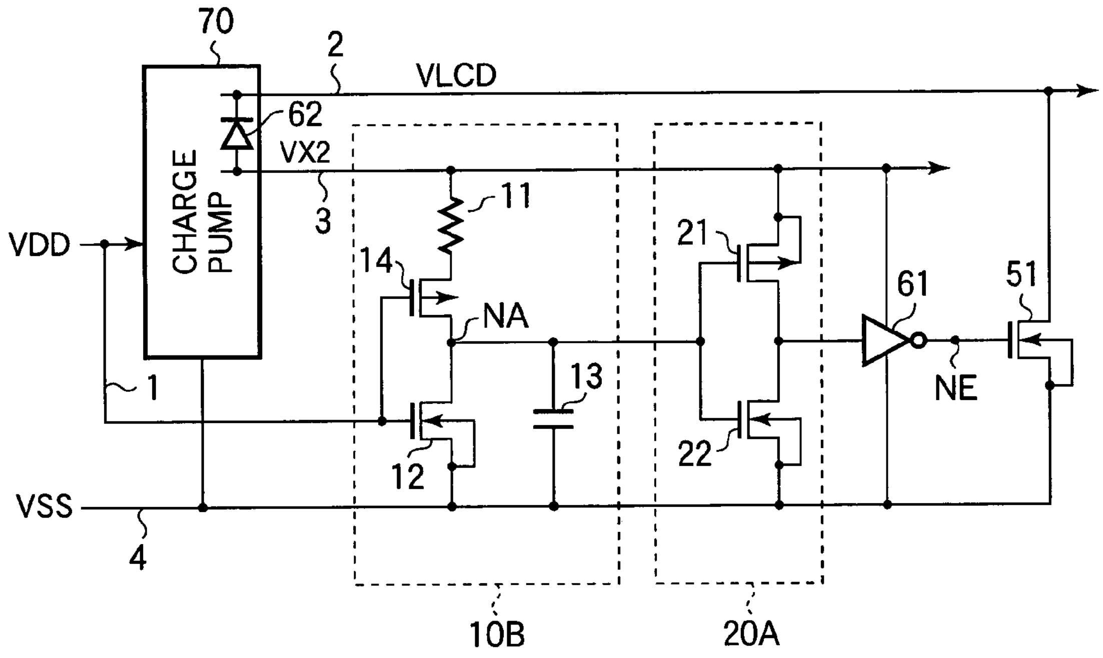
FIG. 7 is a circuit diagram illustrating a power-down circuit according to a third embodiment of the invention.

Referring to FIG. 7, the power-down circuit of the third embodiment has a voltage detector 10B slightly different from the voltage detector 10A in FIG. 5. The voltage detector 10B has a PMOS transistor 14 connected between resistor 11 and node NA. The gate (control terminal) of PMOS transistor 14 is connected to the main power line 1 and controlled by the power supply voltage VDD. The NMOS transistor 12 and capacitor 13 in the voltage detector 10B are the same as in FIG. 5. The inverters 20A, 61 and NMOS transistor 51 are also the same as in FIG. 5.

During normal operation, when the power supply voltage VDD is 3 V, for example, PMOS transistor 14 is at best just barely turned on, and current flow through resistor 11 is reduced to a level such that the voltage drop across resistor 11 is approximately VX2−VDD−Vthp, where Vthp is the threshold voltage of PMOS transistor 14. NMOS transistor 12 is fully turned on, keeping the voltage at node NA at the VSS level.

When the power supply is shut off and the power supply voltage VDD falls toward the ground level, NMOS transistor 12 is turned off and PMOS transistor 14 is turned fully on, so capacitor 13 (node NA) charges through resistor 11 to the VX2 level. Subsequent operations are the same as in the circuit in FIG. 5.

As described above, in addition to the advantages of the second embodiment, the power-down circuit of the third embodiment has the advantage of reduced power consumption during normal operation. If PMOS transistor 14 is fabricated so that its threshold voltage Vthp is greater than VX2−VDD, then substantially no power is consumed during normal operation, the current flow through resistor 11 being reduced to zero.

Figure 8:
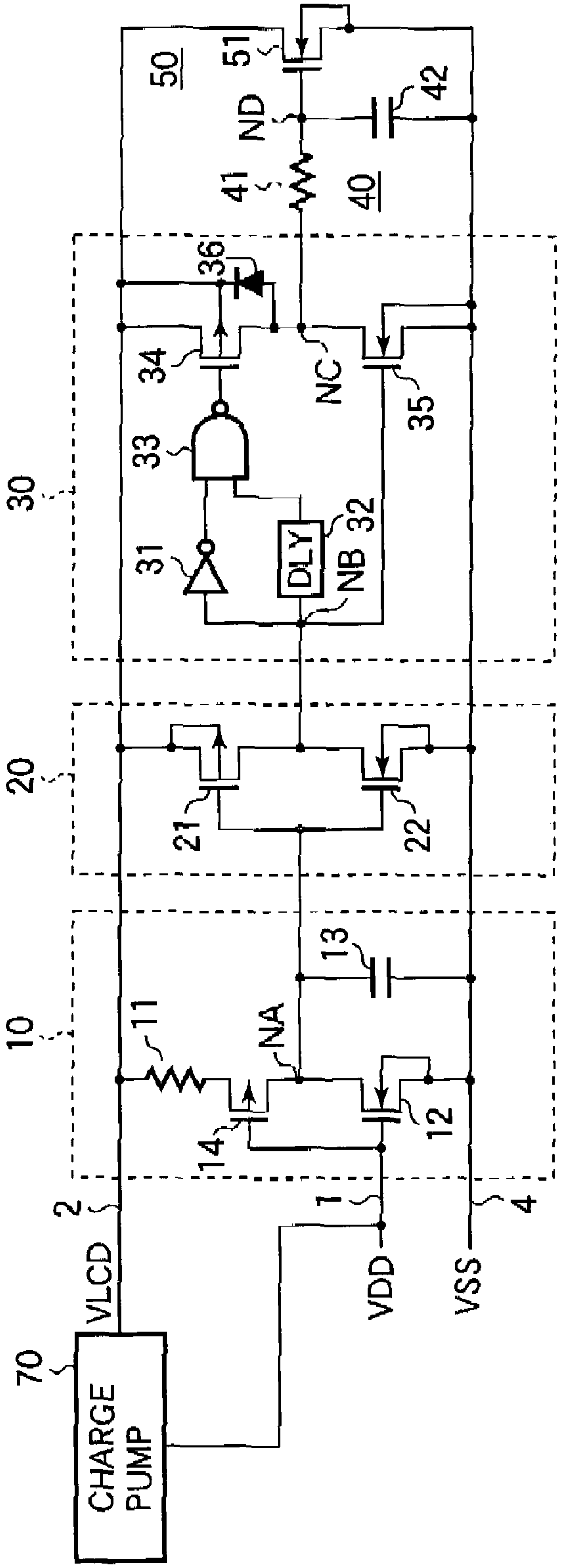
FIG. 8 is a circuit diagram illustrating a variation of the circuit of FIG. 2.

A similar PMOS transistor 14 can be added to the voltage detector 10 in the first embodiment to reduce power consumption, as shown in FIG. 8.

Those skilled in the art will recognize that further variations are possible within the scope of the invention, which is defined in the appended claims.

What is claimed is:

1. A power-down circuit for a display device having a main power line carrying a main power supply voltage, a ground power line carrying a ground voltage lower than the main power supply voltage, and a display voltage generator that boosts the main power supply voltage to generate a display voltage higher than the main power supply voltage and outputs the display voltage on a display power line, the power-down circuit comprising:

a voltage detector connected to the main power line and generating a shutdown signal, the shutdown signal having a first state when the main power supply voltage is above a predetermined level and a second state when the main power supply voltage falls below the predetermined level;

a switch having a control terminal, for connecting the display power line to the ground power line responsive to a voltage applied to the control terminal; and a control circuit for connecting the control terminal of the switch to the ground power line when the shutdown signal is in the first state, and connecting the control terminal of the switch to the display power line through a voltage dropping element when the shutdown signal is in the second state;

wherein the control circuit comprises:

a pulse generator generating a pulse when the shutdown signal changes from the first state to the second state;

a first transistor having a control terminal receiving the pulse from the pulse generator, and having current terminals connected to the display power line and the control terminal of the switch; and a second transistor controlled by the shutdown signal, having current terminals connected to the ground power line and the control terminal of the switch.

2. The power-down circuit of 1, wherein the switch comprises a transistor having a first current terminal connected to the display power line, a second current terminal connected to the ground power line, and a gate, the gate being the control terminal.

3. The power-down circuit of 1, wherein the voltage dropping element is a diode.

4. The power-down circuit of claim 3, wherein the diode is a parasitic diode.

5. The power-down circuit of 1, wherein the control circuit supplies the ground voltage to the control terminal of the switch when the shutdown signal is in the first state, supplies the display voltage to the control terminal of the switch for a predetermined time when the shutdown signal changes from the first state to the second state, and places the control terminal of the switch in a high-impedance state after the predetermined time.

6. The power-down circuit of claim 1, wherein the first transistor has a drain area and a substrate, the substrate being connected to the display power line, the voltage dropping element comprising a parasitic diode formed by the drain area and the substrate.

7. A power-down circuit for a display device having a main power line carrying a main power supply voltage, a ground power line carrying a ground voltage lower than the main power supply voltage, and a display voltage generator that boosts the main power supply voltage to generate a display voltage higher than the main power supply voltage and outputs the display voltage on a display power line, the power-down circuit comprising:

a voltage detector connected to the main power line and generating a shutdown signal, the shutdown signal having a first state when the main power supply voltage is above a predetermined level and a second state when the main power supply voltage falls below the predetermined level;

a switch having a control terminal, for connecting the display power line to the ground power line responsive to a voltage applied to the control terminal;

a control circuit for connecting the control terminal of the switch to the ground power line when the shutdown signal is in the first state, and connecting the control terminal of the switch to the display power line through a voltage dropping element when the shutdown signal is in the second state;

a resistor connected between the control circuit and the control terminal of the switch; and a capacitor connected between the ground power line and the control terminal of the switch.

8. The power-down circuit of claim 7, wherein the switch comprises a transistor having a first current terminal connected to the display power line, a second current terminal connected to the ground power line, and a gate, the gate being the control terminal.

9. The power-down circuit of claim 7, wherein the voltage dropping element is a diode.

10. The power-down circuit of claim 9, wherein the diode is a parasitic diode.

11. The power-down circuit of claim 7, wherein the control circuit supplies the ground voltage to the control terminal of the switch when the shutdown signal is in the first state, supplies the display voltage to the control terminal of the switch for a predetermined time when the shutdown signal changes from the first state to the second state, and places the control terminal of the switch in a high-impedance state after the predetermined time.

12. A power-down circuit for a display device having a main power line carrying a main power supply voltage, a ground power line carrying a ground voltage lower than the main power supply voltage, and a display voltage generator that boosts the main power supply voltage to generate a display voltage higher than the main power supply voltage and outputs the display voltage on a display power line, the power-down circuit comprising:

a voltage detector connected to the main power line and generating a shutdown signal, the shutdown signal having a first state when the main power supply voltage is above a predetermined level and a second state when the main power supply voltage falls below the predetermined level;

a switch having a control terminal, for connecting the display power line to the ground power line responsive to a voltage applied to the control terminal;

a control circuit for connecting the control terminal of the switch to the ground power line when the shutdown signal is in the first state, and connecting the control terminal of the switch to the display power line through a voltage dropping element when the shutdown signal is in the second state; and an inverter connected between the voltage detector and the control circuit, the inverter inverting the shutdown signal, the inverter being powered from the display power line and the ground power line;

wherein the inverter has a switching point closer to the display voltage than to the ground voltage.

13. The power-down circuit of claim 12, wherein the control circuit supplies the ground voltage to the control terminal of the switch when the shutdown signal is in the first state, supplies the display voltage to the control terminal of the switch for a predetermined time when the shutdown signal changes from the first state to the second state, and places the control terminal of the switch in a high-impedance state after the predetermined time.

14. A power-down circuit for a display device having a main power line carrying a main power supply voltage, a ground power line carrying a ground voltage lower than the main power supply voltage, and a display voltage generator that boosts the main power supply voltage to generate a display voltage higher than the main power supply voltage and outputs the display voltage on a display power line, the power-down circuit comprising:

a voltage detector connected to the main power line and generating a shutdown signal, the shutdown signal having a first state when the main power supply voltage is above a predetermined level and a second state when the main power supply voltage falls below the predetermined level;

a switch having a control terminal, for connecting the display power line to the ground power line responsive to a voltage applied to the control terminal; and a control circuit for connecting the control terminal of the switch to the ground power line when the shutdown signal is in the first state, and connecting the control terminal of the switch to the display power line through a voltage dropping element when the shutdown signal is in the second state;

wherein the voltage detector comprises:

a node;

a resistor connected between the node and the display power line;

a first transistor connected between the node and the ground power line, the first transistor having a control terminal connected to the main power line; and a capacitor connected between the node and the ground power line.

15. The power-down circuit of claim 14, wherein the control circuit supplies the ground voltage to the control terminal of the switch when the shutdown signal is in the first state, supplies the display voltage to the control terminal of the switch for a predetermined time when the shutdown signal changes from the first state to the second state, and places the control terminal of the switch in a high-impedance state after the predetermined time.

16. The power-down circuit of claim 14, wherein the voltage detector further comprises a second transistor connected between the resistor and the node, the second transistor having a control terminal connected to the main power line, the second transistor and the first transistor being of mutually complementary conductive types.

17. A power-down circuit for a display device having a main power line carrying a main power supply voltage, a ground power line carrying a ground voltage lower than the main power supply voltage, and a display voltage generator that boosts the main power supply voltage to generate a display voltage higher than the main power supply voltage and outputs the display voltage on a display power line, the power-down circuit comprising:

a voltage detector connected to the main power line and generating a shutdown signal, the shutdown signal having a first state when the main power supply voltage is above a predetermined level and a second state when the main power supply voltage falls below the predetermined level;

a switch having a control terminal, for connecting the display power line to the ground power line responsive to a voltage applied to the control terminal; and a control circuit for connecting the control terminal of the switch to the ground power line when the shutdown signal is in the first state, and connecting the control terminal of the switch to the display power line through a voltage dropping element when the shutdown signal is in the second state;

wherein the display voltage generator also outputs an intermediate boosted voltage, intermediate between the main power supply voltage and the display voltage, on an intermediate power line, and the control circuit comprises a first inverter powered from the intermediate power line and the ground power line, the first inverter inverting the shutdown signal.

18. The power-down circuit of claim 17, wherein the voltage dropping element is a diode having an anode connected to the intermediate power line and a cathode connected to the display power line.

19. The power-down circuit of claim 18, wherein the diode is a parasitic diode in the display voltage generator.

20. The power-down circuit of claim 17, wherein the control circuit further comprises a second inverter coupled between the first inverter and the control terminal of the switch, the second inverter being powered from the intermediate power line and the ground power line.

21. The power-down circuit of claim 17, wherein the voltage detector comprises:

a node;

a resistor connected between the node and the intermediate power line;

a first transistor connected between the node and the ground power line, the first transistor having a control terminal connected to the main power line; and a capacitor connected between the node and the ground power line.

22. The power-down circuit of claim 21 wherein the voltage detector further comprises a second transistor connected between the resistor and the node, the second transistor having a control terminal connected to the main power line, the second transistor and the first transistor being of mutually complementary conductive types.

* * * * *